United States Patent
Saito et al.

(10) Patent No.: US 9,789,684 B2
(45) Date of Patent: Oct. 17, 2017

(54) CONTROL DEVICE FOR CONTROLLING PRINTER HAVING PRINT HEAD

(71) Applicant: BROTHER KOGYO KABUSHIKI KAISHA, Nagoya, Aichi (JP)

(72) Inventors: Shingo Saito, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/392,429

(22) Filed: Dec. 28, 2016

(65) Prior Publication Data

US 2017/0197408 A1 Jul. 13, 2017

(30) Foreign Application Priority Data

Jan. 8, 2016 (JP) ................................. 2016-002865

(51) Int. Cl.
*B41J 2/045* (2006.01)

(52) U.S. Cl.
CPC ....... *B41J 2/04536* (2013.01); *B41J 2/04586* (2013.01); *B41J 2/04545* (2013.01)

(58) Field of Classification Search
CPC B41J 2/04551; B41J 2/04586; B41J 2/04596; B41J 2/04598; B41J 2/04573; B41J 2/0458; B41J 2/04536; B41J 2/04545; B41J 2/04578; B41J 2/04591
See application file for complete search history.

(56) References Cited

U.S. PATENT DOCUMENTS

| 5,485,285 A | 1/1996 | Tachibana |
| 2016/0167376 A1* | 6/2016 | Katsuyama .......... G06K 15/107 347/15 |

FOREIGN PATENT DOCUMENTS

| JP | H04-140962 A | 5/1992 |
| JP | H06-98119 A | 4/1994 |
| JP | 2008-219810 A | 9/2008 |

* cited by examiner

*Primary Examiner* — Thinh H Nguyen
(74) *Attorney, Agent, or Firm* — Scully, Scott, Murphy & Presser, PC (57) ABSTRACT

In a control device, a controller is configured to perform: determining whether to print a target unit image according to J number of index values respectively corresponding to J number of target partial images; in response to determining to print the target unit image, controlling a printer to execute ejection processing and movement processing for printing a band image constituted with H number of successive unit images arranged in a sub-scanning direction and including the target unit image, the ejection processing ejecting a droplet of coloring material onto a printing medium while moving a print head in a main scanning direction, the movement processing moving the printing medium in the sub-scanning direction with respect to the print head; and in response to determining not to print the target unit image, controlling the printer to execute the movement processing but not execute the ejection processing for printing the target unit image.

11 Claims, 5 Drawing Sheets

CONTROL DEVICE FOR CONTROLLING PRINTER HAVING PRINT HEAD

CROSS REFERENCE TO RELATED APPLICATION

This application claims priority from Japanese Patent Application No. 2016-002865 filed on Jan. 8, 2016. The entire content of the priority application is incorporated herein by reference.

TECHNICAL FIELD

The present disclosure relates to processing for printing an image.

BACKGROUND

There has conventionally been used a device that prints an image represented by image data by allowing a recording head to perform sequential scanning. In order to increase printing speed of the device, there has been proposed a technique of conveying a recording medium by a conveying means without performing scanning by the recording head for an area in an image corresponding to, if any, one set or continuous sets of line data which are constituted only with pixels representing white in image data.

SUMMARY

There may exist a blank space in an image represented by image data. For the blank space, processing of conveying a recording medium should be performed without performing scanning by a recording head. However, a blank space may include an area having a color different from white. For example, in scanning processing, there is a case where scan data obtained by scanning an original includes data corresponding to a blank space of the original which has a pixel having a color different from white. In such a case, the conventional technique has sometimes been unable to appropriately determine whether or not to print each area of an image having a blank space.

In view of the foregoing, it is an object of the disclosure to provide a technique capable improving accuracy when determining whether or not to print each area of an image represented by image data.

In order to attain the above and other objects, the present disclosure provides a control device for controlling a printer. The printer includes: a print head. The print head is configured to move in a main scanning direction and has a plurality of nozzles arranged in a sub-scanning direction perpendicular to the main scanning direction. Each of the plurality of nozzles is configured to eject a droplet of coloring material onto a printing medium. The control device includes a controller. The controller is configured to perform: acquiring target image data representing a target image, the target image including a plurality of unit images, each of the plurality of unit images extending in the main scanning direction; specifying a target unit image among the plurality of unit images, the target unit image including N number of partial images arranged in the main scanning direction, where N is an integer equal to or greater than two; specifying J number of target partial images among the N number of partial images, where J is an integer equal to or greater than one and equal to or smaller than N; calculating J number of index values corresponding to respective ones of the J number of target partial images, each of the J number of index values being calculated using a plurality of pixel values of a plurality of pixels included in corresponding one of J number of target partial data, the J number of target partial data representing respective ones of the J number of target partial images; determining whether to print the target unit image according to the J number of index values; in response to determining to print the target unit image, controlling the printer to execute ejection processing and movement processing for printing a band image onto the printing medium, the band image constituted with H number of successive unit images arranged in the sub-scanning direction and including the target unit image, the ejection processing ejecting the droplet of the coloring material onto the printing medium while moving the print head in the main scanning direction, the movement processing moving the printing medium in the sub-scanning direction with respect to the print head, where H is an integer equal to or greater than one; and in response to determining not to print the target unit image, controlling the printer to execute the movement processing but not execute the ejection processing for printing the target unit image onto the printing medium.

According to another aspect, present disclosure provides a non-transitory computer readable storage medium storing a set of program instructions for a control device for controlling a printer. The printer includes a print head. The print head is configured to move in a main scanning direction and has a plurality of nozzles arranged in a sub-scanning direction perpendicular to the main scanning direction. Each of the plurality of nozzles is configured to eject a droplet of coloring material onto a printing medium. The control device includes a controller. The set of program instructions, when executed by the controller, causes the control device to perform: acquiring target image data representing a target image, the target image including a plurality of unit images, each of the plurality of unit images extending in the main scanning direction; specifying a target unit image among the plurality of unit images, the target unit image including N number of partial images arranged in the main scanning direction, where N is an integer equal to or greater than two; specifying J number of target partial images among the N number of partial images, where J is an integer equal to or greater than one and equal to or smaller than N; calculating J number of index values corresponding to respective ones of the J number of target partial images, each of the J number of index values being calculated using a plurality of pixel values of a plurality of pixels included in corresponding one of J number of target partial data, the J number of target partial data representing respective ones of the J number of target partial images; determining whether to print the target unit image according to the J number of index values; in response to determining to print the target unit image, controlling the printer to execute ejection processing and movement processing for printing a band image onto the printing medium, the band image constituted with H number of successive unit images arranged in the sub-scanning direction and including the target unit image, the ejection processing ejecting the droplet of the coloring material onto the printing medium while moving the print head in the main scanning direction, the movement processing moving the printing medium in the sub-scanning direction with respect to the print head, where H is an integer equal to or greater than one; and in response to determining not to print the target unit image, controlling the printer to execute the movement processing but not execute the ejection processing for printing the target unit image onto the printing medium.

BRIEF DESCRIPTION OF THE DRAWINGS

The particular features and advantages of the disclosure as well as other objects will become apparent from the following description taken in connection with the accompanying drawings, in which:

FIGS. 5A and 5B are explanatory views of a relationship between a largest index value and an image of a unit area, in which FIG. 5A shows an example of an image of a unit area when the largest index value is small, and FIG. 5B shows an example of an image of a unit area when the largest index value is large.

DETAILED DESCRIPTION

A. Embodiment

Figure 1:
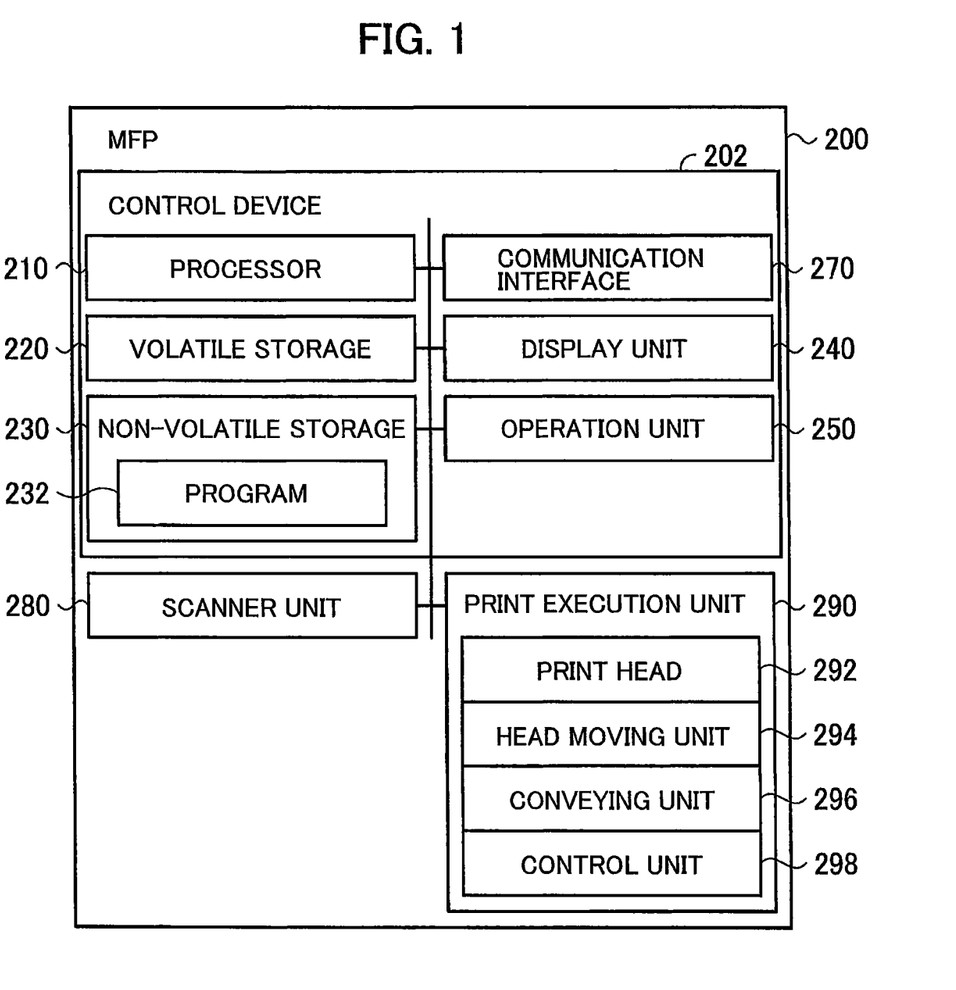
FIG. 1 is a block diagram showing a multi-function peripheral according to an embodiment.

FIG. 1 is a block diagram showing a multi-function peripheral (MFP) 200 according to an embodiment. The MFP 200 includes a control device 202, a scanner unit 280, and a print execution unit 290. The control device 202 includes a processor 210, a volatile storage 220, a non-volatile storage 230, a display unit 240, an operation unit 250, and a communication interface 270. These components are connected with each other via a bus.

The processor 210 is a device that performs data processing, and is, for example, a central processing unit (CPU). The volatile storage 220 is, for example, a dynamic random access memory (DRAM). The non-volatile storage 230 is, for example, a flash memory.

The non-volatile storage 230 stores a program 232. The processor 210 executes the program 232 to implement a variety of functions (details will be described later). The processor 210 temporarily stores a variety of sets of intermediate data used for execution of the program 232 in a storage (for example, either the volatile storage 220 or the non-volatile storage 230). In the present embodiment, the program 232 is stored in the non-volatile storage 230 as firmware by a manufacturer of the MFP 200.

The display unit 240 is a device that displays an image, and is, for example, a liquid crystal display. The operation unit 250 is a device that accepts user operations, and is, for example, a touchscreen that is integrally configured with the display unit 240. The user can input various instructions to the MFP 200 by operating the operation unit 250.

The communication interface 270 is an interface for communicating with other devices (for example, a universal serial bus (USB) interface, a wired local area network (LAN) interface, or a wireless interface of IEEE802.11).

The scanner unit 280 generates scan data representing a read image (referred to as "scan image") by optically reading an object, such as an original, through using a photoelectric conversion element, such as a charge coupled device (CCD) and a complementary metal oxide semiconductor (CMOS). The scan data is, for example, RGB bitmap data that represents a color scan image.

The print execution unit 290 is a device that prints an image on a sheet (an example of a print medium). In the present embodiment, the print execution unit 290 includes a print head 292, a head moving unit 294, a conveying unit 296, and a control unit 298 that controls these components 292, 294, and 296. Although details will be described later, the print execution unit 290 is an inkjet printer that uses ink of cyan C, magenta M, yellow Y, and black K. Combinations of a plurality of kinds of ink which can be used are not limited to CMYK, but a variety of other combinations (for example, three kinds of cyan C, magenta M, and yellow Y) may be used.

The control device 202 (more specifically, the processor 210) drives the scanner unit 280 in accordance with instructions from a user to optically read an object so as to generate scan data representing an image of the object. The control device 202 can control the print execution unit 290 to print the image represented by the scan data. The control device 202 can also control the print execution unit 290 to print an image by using image data supplied by other devices (for example, a computer (not shown) connected to the communication interface 270).

Figure 2:
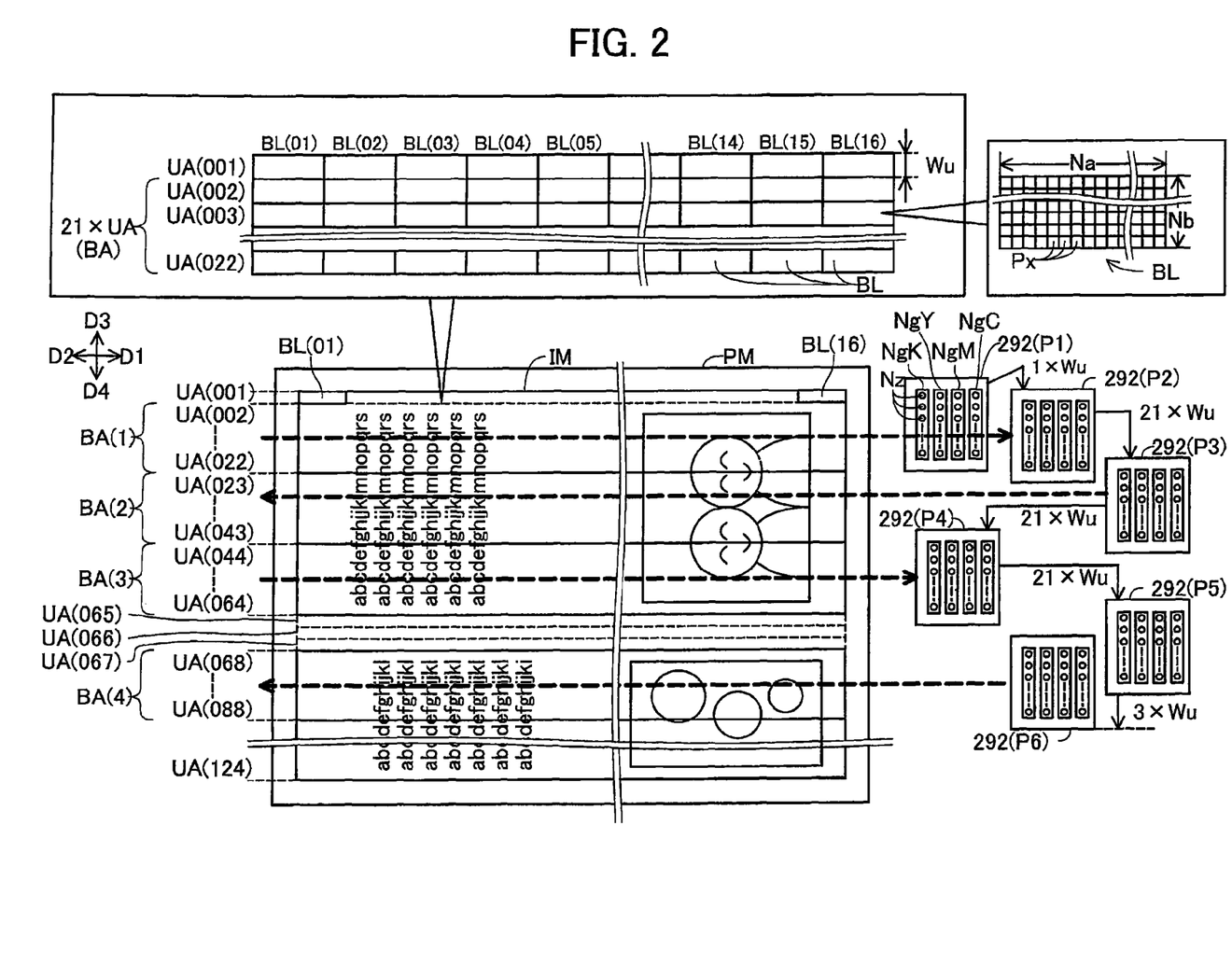
FIG. 2 is an explanatory view of an example of a target image to be printed on a sheet, examples of a position of a print head with respect to the sheet during printing the target image, a plurality of unit areas constituting the target image, and a plurality of partial areas constituting unit areas.

FIG. 2 is an explanatory view of an example of a target image IM which is an image to be printed on a sheet PM, examples of a position of the print head 292 with respect to the sheet PM during printing the target image IM, a plurality of unit areas UA constituting the target image IM, and a plurality of partial areas BL constituting one unit areas UA. Each of a first direction D1 and a second direction D2 illustrated in FIG. 2 represents a main scanning direction (the second direction D2 is a direction opposite to the first direction D1). The head moving unit 294 (FIG. 1) is a device that reciprocally moves the print head 292 in the main scanning directions. Although not shown, the head moving unit 294 includes, for example, a rail, a plurality of pulleys, a belt, and a motor. The rail supports the print head 292 slidably in the main scanning directions. The belt is wound around the plurality of pulleys, and a part of the belt is fixed to the print head 292. The motor rotates the pulleys. The print head 292 moves in the main scanning directions through the rotation of the pulleys.

A third direction D3 illustrated in FIG. 2 represents a sub-scanning direction (also referred to as the "sub-scanning direction D3"). The conveying unit 296 (FIG. 1) is a device that conveys the sheet PM in the sub-scanning direction D3 with respect to the print head 292. Although not shown, the conveying unit 296 includes, for example, a table, an upstream roller, a downstream roller, and a motor. The table supports the sheet PM at a position confronting the print head 292. The upstream roller is disposed upstream of the print head 292 in the sub-scanning direction D3. The downstream roller is disposed downstream of the print head in the sub-scanning direction D3. The motor rotates the upstream and downstream rollers. The sheet PM is conveyed in the sub-scanning direction D3 by the rotating rollers. In the present embodiment, the sub-scanning direction D3 is a direction perpendicular to the main scanning directions D1 and D2.

A plurality of print heads 292 at different relative positions in the sub-scanning direction D3 with respect to the sheet PM are shown on the right of the sheet PM in FIG. 2. Parenthesized reference marks P1 to P6 next to the reference numeral 292 of the print heads identify the relative positions in the sub-scanning direction D3. A nozzle layout on a bottom surface of the print head 292 is schematically shown in each of the print heads 292 illustrated in FIG. 2. On the bottom surface of the print head 292, there are formed a nozzle group NgC for ejecting cyan C ink, a nozzle group NgM for ejecting magenta M ink, a nozzle group NgY for ejecting yellow Y ink, and a nozzle group NgK for ejecting black K ink, as illustrated in FIG. 2. Positions of each of a plurality of nozzles Nz in one nozzle group in the sub-scanning direction D3 are different from each other. In the present embodiment, the plurality of nozzles Nz in one nozzle group is arranged along the sub-scanning direction D3. Positions in the main scanning directions are same among the plurality of nozzles Nz in one nozzle group. However, the positions in the main scanning directions may differ between at least a part of nozzles Nz and the other nozzles Nz. The four nozzle groups NgC, NgM, NgY, and NgK are arranged along the main scanning directions.

The print execution unit 290 (FIG. 1) ejects ink droplets from the plurality of nozzles Nz in the plurality of nozzle groups NgC, NgM, NgY, and NgK to the sheet PM while moving the print head 292 in the main scanning directions to thereby form dots of coloring materials on a band area BA (described later) of the sheet PM that extends in the main scanning directions. Hereinafter, processing of ejecting ink droplets on the band area BA of the sheet PM while moving the print head 292 in the main scanning direction will be referred to as "ejection processing." The print execution unit 290 conveys the sheet PM in the sub-scanning direction D3. The print execution unit 290 alternately repeats the ejection processing and the conveyance of the sheet PM (also referred to as "movement processing") to thereby print the entire image on the sheet PM. Printing of the target image IM progresses in a direction D4 opposite to the sub-scanning direction D3. Hereinafter, the sub-scanning direction D3 will also be referred to as an "upstream direction D3", and the direction D4 opposite to the sub-scanning direction D3 will also be referred to as a "downstream direction D4".

In the present embodiment, an external form of the target image IM is rectangular. Although not shown, the target image IM is represented by a plurality of pixels arranged in a grid shape along the main scanning direction D1 and the sub-scanning direction D3. The target image IM is divided into a plurality of unit areas UA. Each of the unit areas UA is a rectangular area that extends in the main scanning directions (D1 and D2). In the example illustrated in FIG. 2, one-hundred twenty-four unit areas UA arranged along the sub-scanning direction D3 constitutes the target image IM. In FIG. 2, parenthesized reference numerals next to the reference mark UA of the unit areas are identification numbers for explaining the unit areas. Identification numbers from 1 to 124 are assigned in an ascending order in the downstream direction D4 (number 1 is assigned to the unit area UA at the most downstream end in the upstream direction D3, and number 124 is assigned to the unit area UA at the most downstream end in the downstream direction D4).

In the upper part of FIG. 2, twenty-two unit areas UA assigned with consecutive numbers 1 to 22 are illustrated. A width Wu illustrated in FIG. 2 represents a width in the sub-scanning direction D3 of one unit area UA. One unit area UA is divided into a plurality of partial areas BL arranged along the main scanning direction D1. Each of the partial areas BL is a rectangular area that extends in the main scanning directions (D1 and D2). In the example illustrated in FIG. 2, sixteen partial areas BL arranged along the main scanning direction D1 constitutes one unit area UA. In FIG. 2, parenthesized reference numerals next to the reference mark BL of the partial areas are identification numbers for explaining the partial areas. Identification numbers from 1 to 16 are assigned in an ascending order in the main scanning direction D1 (number 1 is assigned to the partial area BL at the most downstream end in the second direction D2, and number 16 is assigned to the partial area BL at the most downstream end in the first direction D1).

In the upper-right part of FIG. 2, an enlarged diagram of one partial area BL is illustrated. The partial area BL is configured with a plurality of pixels Px arranged in a grid form. A first number Na illustrated in the enlarged diagram represents the number of pixels Px in the main scanning direction D1, and a second number Nb represents the number of pixels Px in the sub-scanning direction D3. In the present embodiment, Na>Nb is established. Both the two numbers Na and Nb are equal to or greater than two (for example, Na=430, Nb=20). However, Na≤Nb may also be established, or at least one of the two numbers Na and Nb may be one.

The pixels Px are a plurality of pixels for printing processing. As described later, a formation state of dots by coloring materials is determined for each of the pixels Px. The dot formation state in the present embodiment is selected from two states, "No dot" and "Dot is formed". The total number of dot formation states may be any number equal to or greater than three in place of two. For example, the dot formation state may be selected from four states, "No dot", "Small dot", "Middle dot", and "Large dot".

As a density of the pixels Px (also referred to as a print resolution) on the sheet PM, a plurality of resolutions can be employed. In the present embodiment, a user can select a print resolution from a first resolution and a second resolution which has a higher density than the first resolution. The print resolution is expressed, for example, by the product of a pixel density in the main scanning direction and a pixel density in the sub-scanning direction. The first resolution is, for example, 600×300 dots per inch (dpi). The second resolution is, for example, 1200×600 dpi. FIG. 2 shows an example of the first resolution. The printing processing at the first resolution can reduce the time required for the processing compared to that at the second resolution. The printing processing at the second resolution can improve the graininess compared to that at the first resolution.

In single ejection processing, dots of coloring materials can be formed in a band-like area constituted with one or more continuous unit areas UA. Hereinafter, an area of dots that can be formed by single ejection processing will be referred to as a "band area". A width in the sub-scanning direction D3 of the band area BA is the same as a width in the sub-scanning direction D3 of a distribution area of the nozzles Nz in the print head 292. In the present embodiment, twenty-one continuous unit areas UA constitute one band area BA when the print resolution is the first resolution. Printing processing of the target image IM progresses, for example, as described below. Printing of all the pixels Px in one band area BA is performed in single ejection processing. The print execution unit 290 alternately repeats the ejection processing and the conveyance of the sheet PM in the sub-scanning direction D3 (movement processing) so as to print the entire target image IM. As described above, the print execution unit 290 is operable in a print mode in which the number of passes is one when printing of the band area BA is executed. The number of passes is the number of scanning times of the print head 292 in a direction parallel to the main scanning directions (D1 and D2). Hereinafter, the print mode in which the number of passes is one will also be referred to as a single-pass mode. FIG. 2 shows an example of the processing in the single-pass mode. The number of passes can also be considered as the number of scanning times of one partial area BL on the sheet PM by the print head 292 when the printing processing is executed.

Although not shown, the print execution unit 290 is operable in a print mode in which printing of one band area BA is performed by multiple ejection processing. For example, the configuration may be such that odd-number-th ejection processing forms dots at the odd-numbered pixels Px among a plurality of pixels Px arranged along the main scanning direction D1, and even-number-th ejection processing forms dots at the even-numbered pixels Px among the plurality of pixels Px arranged along the main scanning direction D1. In this case, printing of one pixel line that extends in the main scanning direction D1 is completed by performing a couple of ejection processing.

As a specific printing method in the print mode in which printing of one pixel line is completed by performing a couple of ejection processing as described above, there can be employed, for example, a method described below. The ejection processing and the conveyance of the sheet PM in the sub-scanning direction D3 (movement processing) are alternately repeated. A conveying amount in single movement processing is half the width in the sub-scanning direction D3 of the distribution area of the nozzles Nz in the print head 292. One band area (referred to as a target band area) BA is printed by continuously performing the ejection processing three times. More specifically, the first ejection processing forms dots at odd-numbered pixels Px within a half area located on the downstream side in the upstream direction D3 of the target band area. The second ejection processing forms dots at even-numbered pixels within the entire target band area BA. The third ejection processing forms dots at the odd-numbered pixels Px of another half area located on the downstream side in the downstream direction D4 of the target band area. In this case, a partial area BL (for example, partial area BL within the half area located on the downstream side in the upstream direction D3 of the target band area) of the sheet PM is printed by performing a couple of ejection processing. That is, when printing is executed, the number of scanning times of one partial area BL of the sheet PM by the print head 292 is two. Accordingly, the number of passes is two. Hereinafter, a print mode in which the number of passes is two or more will also be referred to as a multi-pass mode.

In the single-pass mode, the time required for the printing processing can be reduced as compared to the multi-pass mode. The printing processing in the multi-pass mode can restrict the misregistration of the dot formation position from being noticeable as compared to that in the single-pass mode.

In the present embodiment, a user can set print quality in settings for printing. As the print quality, for example, one of "Fast" and "Fine" can be selected. When the "Fast" is selected, the number of passes is set to "one", and the print resolution is set to the "first resolution". When the "Fine" is selected, the number of passes is set to "two", and the print resolution is set to the "second resolution".

Figure 3:
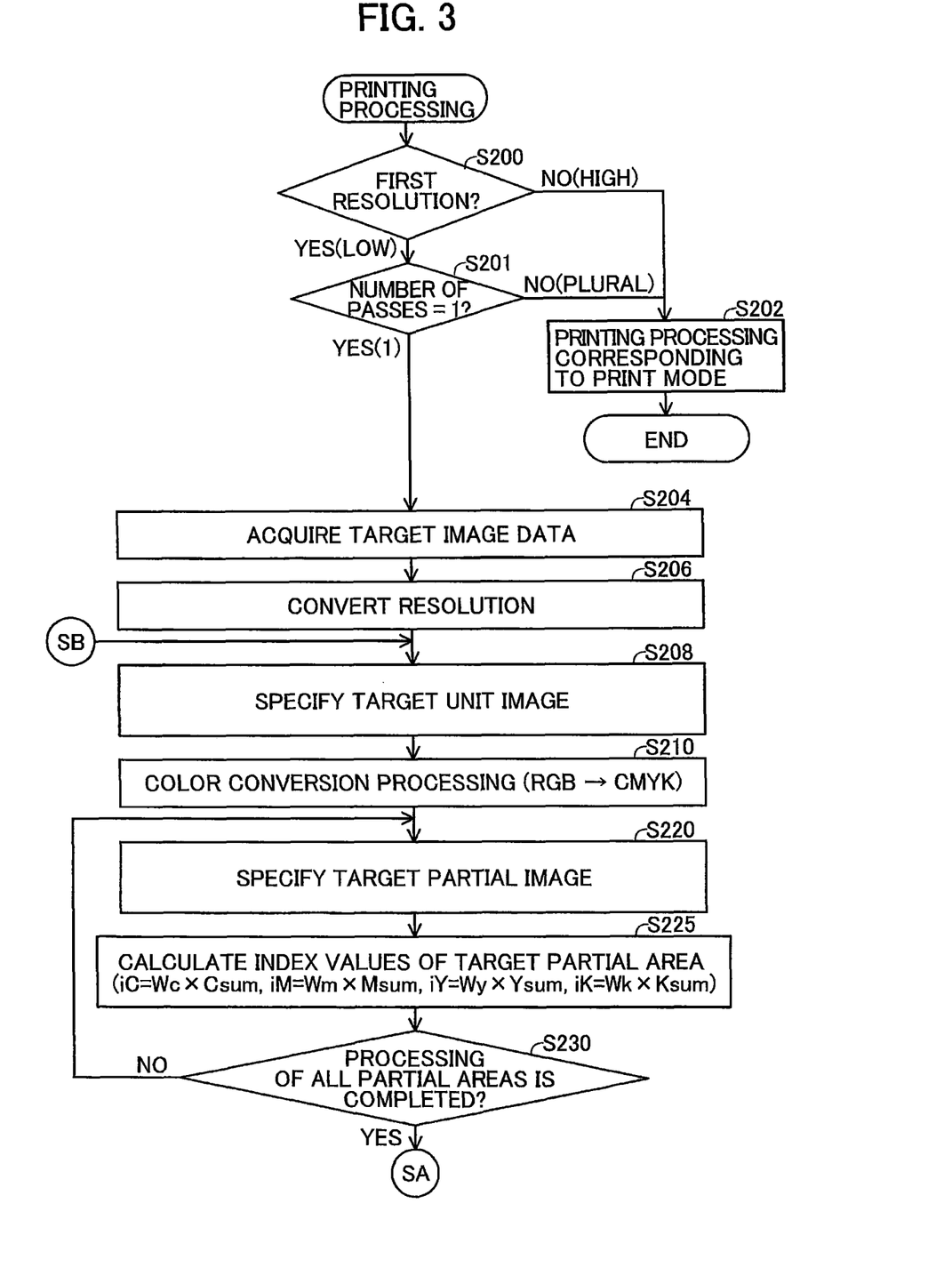
FIGS. 3 and 4 show a flowchart illustrating an example of steps in printing processing, in which the steps illustrated in FIG. 4 are performed subsequent to the steps illustrated in FIG. 3.
Figure 4:
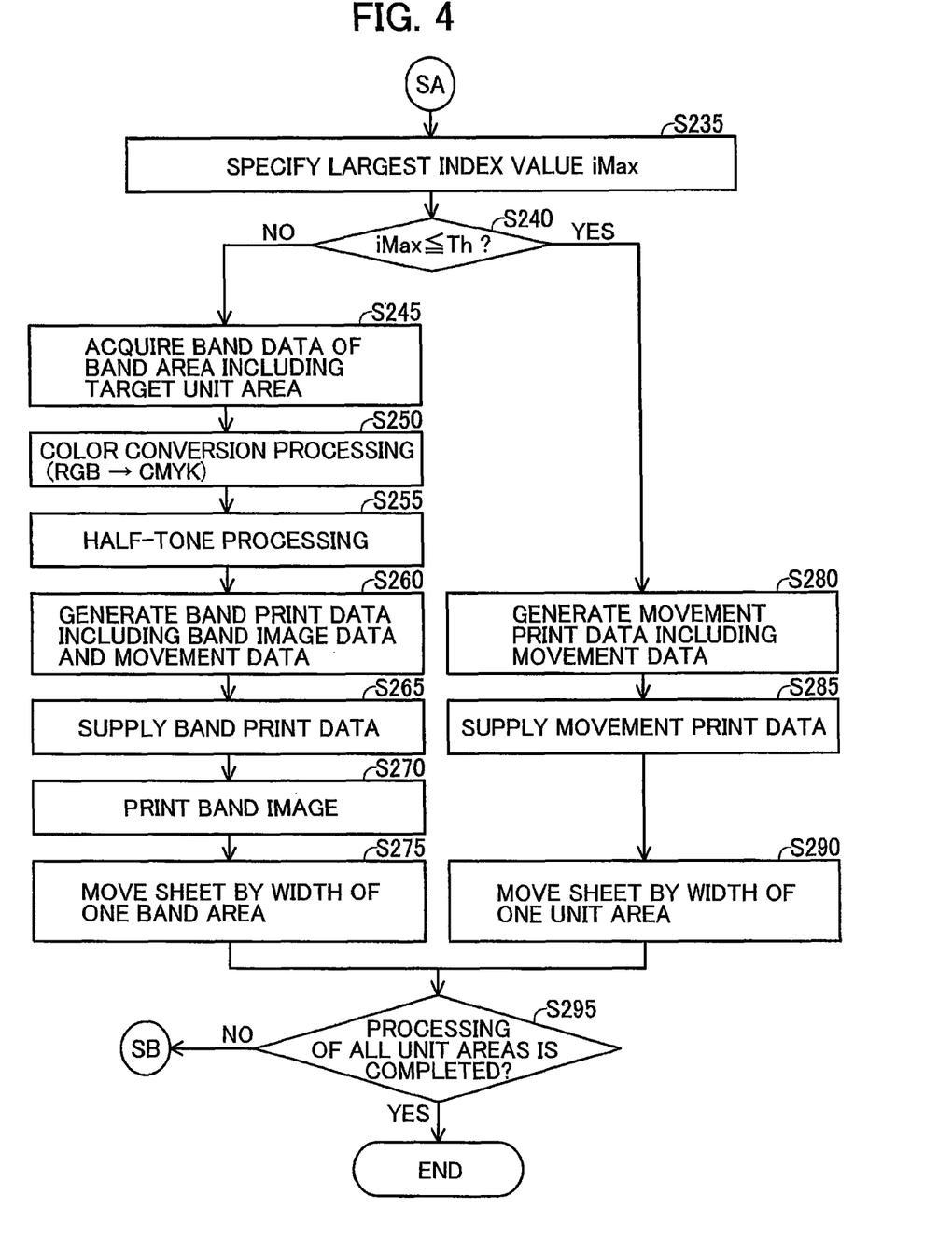

FIGS. 3 and 4 show a flowchart illustrating an example of steps in the printing processing. The steps illustrated in FIG. 4 are performed subsequent to the steps illustrated in FIG. 3. The printing processing is executed when, for example, a user inputs a "Copy" instruction by operating the operation unit 250 (FIG. 1). When the "Copy" instruction is inputted, the processor 210 drives the scanner unit 280 to generate scan data, and temporarily stores the generated scan data in a storage (for example, either the volatile storage 220 or the non-volatile storage 230). The processor 210 then executes the printing processing using the scan data in the storage.

The user can set the print quality described above in advance prior to providing the instructions such as a "Copy" instruction. Although not shown, the processor 210 stores setting information indicating the setting selected by the user in the non-volatile storage 230. The processor 210 can execute the printing processing in accordance with instructions not only for the "Copy" instruction but also for other processing (for example, an instruction for printing using image data designated by the user).

In S200 of FIG. 3, the processor 210 refers to the setting information in the storage to determine whether or not the print resolution is set to the first resolution. When the print resolution is set to the second resolution (that is, high resolution) (S200: NO), the processor 210 proceeds to S202. When the print resolution is set to the first resolution (that is, low resolution) (S200: YES), in S201 the processor 210 determines whether or not the number of passes is set to one. When a plurality of passes is set (S201: NO), the processor 210 proceeds to S202. In S202, the processor 210 executes printing processing corresponding to the print mode. In the present embodiment, in S202 the processor 210 controls the print execution unit 290 to execute the ejection processing over the entire target image. As the processing of S202, various well-known procedures can be employed (for which detailed description will be omitted). The processor 210 completes the printing processing when printing of the image is completed.

When the print resolution is set to the first resolution (S200: YES) and the number of passes is set to one (S201: YES), in S204 the processor 210 acquires target image data which is image data to be printed. For example, the processor 210 acquires scan data stored in the storage from that storage. Hereinafter, description will be made by assuming that the target image IM illustrated in FIG. 2 is represented by the target image data. In S206, the processor 210 converts a resolution of the target image data to the print resolution. As a method of converting the resolution, a well-known method (for example, interpolation and the like) can be employed. When the resolution of the scan data is the same as the print resolution, the processing in S206 is omitted.

In S208, the processor 210 acquires unit data representing the target unit area which is an unprocessed unit area UA among a plurality of unit areas UA that constitutes the target image IM (FIG. 2). Here, the unit data represents a unit image which is an image in the unit area UA. In the present embodiment, the target unit area is the unit area UA located on the most downstream side in the upstream direction D3 among the unprocessed unit areas UA. For example, in the example illustrated in FIG. 2, the first unit area UA(001) is the target unit area when S208 is executed for the first time. It can be considered that the processor 210 specifies in S208 the target unit area (that is, the target unit image which is an image of the target unit area).

In S210, the processor 210 converts a pixel value of each pixel in the unit data of the target unit area from an RGB tone value to a CMYK tone value corresponding to color components of coloring materials for printing. Correspondence relationships between RGB and CMYK are specified in advance by a lookup table (not shown) which has been preliminarily stored in the non-volatile storage 230. The processor 210 refers to the lookup table to execute the color conversion.

In S220, the processor 210 acquires target partial data representing a target partial area from the unit data representing the target unit area. The target partial area is an unprocessed partial area BL among the plurality of partial areas BL in the target unit area, and the partial data represents a partial image which is an image in the partial area BL. In the present embodiment, the target partial area is the partial area BL located on the most downstream side in the second direction D2 among the unprocessed partial areas BL. For example, in the example illustrated in FIG. 2, the first partial area BL(01) is the target partial area when S220 is executed for the first time. It can be considered that the processor 210 specifies in S220 the target partial area (that is, a target partial image which is an image of the target partial area).

In S225, the processor 210 calculates index values of the target partial area. In the present embodiment, the processor 210 calculates the index values for each type of coloring materials used for printing. More specifically, an index value iC of cyan C, an index value iM of magenta M, an index value iY of yellow Y, and an index value iK of black K are calculated. In the present embodiment, the processor 210 calculates a total value Csum of tone values of cyan C of a plurality of pixels in the target partial area, and multiplies the cyan total value Csum by a predetermined weight Wc of cyan C to calculate the cyan index value iC. Similarly, the magenta index value iM is calculated through multiplying a magenta total value Msum by a magenta weight Wm, and the yellow index value iY is calculated through multiplying a yellow total value Ysum by a yellow weight Wy, and the black index value iK is calculated through multiplying a black total value Ksum by a black weight Wk. The weights Wc, Wm, Wy, and Wk of the color components indicate darkness of dots of the respective coloring materials, and are determined in advance (for example, Wc=0.41, Wm=0.43, Wy=0.27, and Wk=1). Each of the index values iC, iM, iY, and iK calculated in the above described manner indicates darkness of each color (that is, an amount of each coloring material) of a plurality of pixels in the target area. The larger the index values iC, iM, iY, and iK are, the darker the respective colors are (that is, the larger the respective amounts of coloring materials are). There is high possibility that a dark color in the target partial area indicates that the target partial area represents an object, such as a letter and a photograph, rather than the background.

In S230, the processor 210 determines whether or not the processing of all the partial areas BL in the target unit area has been completed. If there remains an unprocessed partial area BL (S230: NO), the processor 210 returns to S220, and executes processing of the unprocessed partial area BL.

When the processing of all the partial areas BL has been completed (S230: YES), the processor 210 specifies the largest index value iMax among four types of the index values iC, iM, iY, and iK for each of sixteen partial areas BL (that is, 16×4 =64 index values) in S235 (FIG. 4).

Figures 5A, 5B:
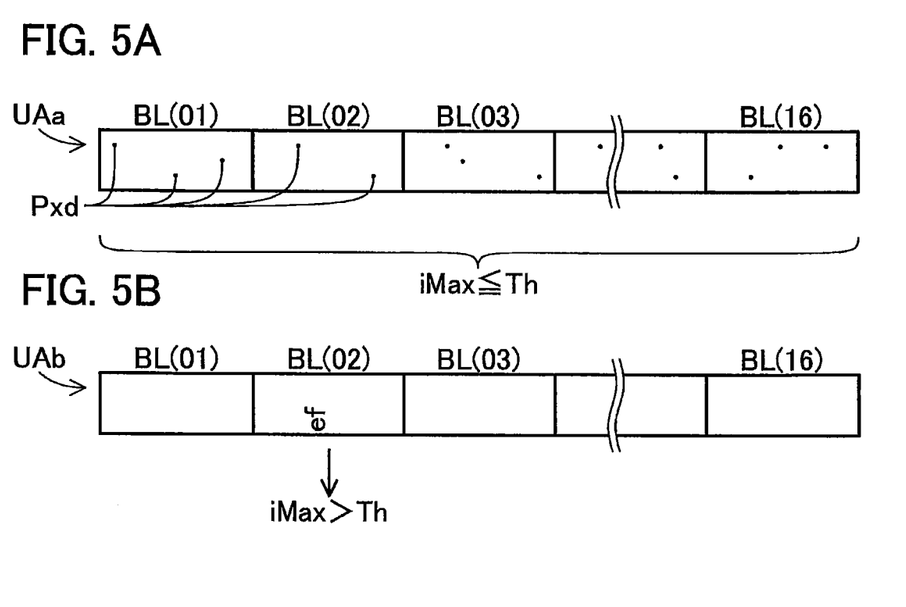

In S240, the processor 210 determines whether or not the largest index value iMax is equal to or smaller than a predetermined threshold value Th. FIGS. 5A and 5B are explanatory views of a relationship between the largest index value iMax and an image of a unit area UA. FIG. 5A shows an example of an image of a unit area UAa when the largest index value iMax is small. FIG. 5B shows an example of an image of a unit area UAb when the largest index value iMax is large.

The unit area UAa illustrated in FIG. 5A is an area representing a blank in the target image. In the unit area UAa, a plurality of pixels Pxd darker than white are distributed among a plurality of partial areas BL. The total number of the plurality of pixels Pxd is so small that, when an image represented by the pixels Pxd is printed, the image cannot easily be recognized visually by the naked eye. Such a small number of the pixels Pxd may be generated, for example, during scanning the original or during performing the image processing. For example, minute irregularities may be formed on a surface of the original due to a plurality of fibers from which paper is made. When scan data is generated by reading the original using the scanner unit 280, the scan data representing light shadows (that is, noise) caused by such minute irregularities may be generated. Pixels representing such noise may be sparsely distributed among the plurality of partial areas BL, like the plurality of pixels Pxd illustrated in FIG. 5A. By repeating lossy compression and decompression of image data, pixels representing noise such as the pixels Pxd illustrated in FIG. 5A may be generated. Small index values iC, iM, iY, and iK are calculated from the plurality of partial areas BL in the unit area UAa which only represents such noise. Accordingly, the largest index value iMax for the unit area UAa is also small.

The unit area UAb illustrated in FIG. 5B is an area representing a part of an object in the target image. In the example illustrated in FIG. 5B, the second partial area BL(02) represents a part of a character string. As described above, large index values iC, iM, iY, and iK are calculated from the partial area BL representing an object. Accordingly, the largest index value iMax becomes large due to the index values iC, iM, iY, and iK calculated from the partial area BL representing the object even when each of the other partial areas BL of the unit area UAb does not represent an object but represents a blank.

The threshold value Th used in S240 (FIG. 4) is determined in advance so that the largest index value iMax having a small value and calculated from the unit area UAa representing only noise as illustrated in FIG. 5A can be distinguished from the largest index value iMax having a large value and calculated from the unit area UAb representing the object as illustrated in FIG. 5B.

When iMax≤Th (S240: YES), that is, the target unit area represents only noise, the processor 210 generates movement print data in S280. The movement print data is print data that does not include image data for executing the ejection processing but include only movement data for moving the sheet PM (movement processing). The print data is data in a format that can be interpreted by the control unit 298 of the print execution unit 290. In S280, the movement print data including movement data for moving the sheet PM by the same distance as the width Wu of one unit area UA (FIG. 2) is generated.

In S285, the processor 210 supplies the generated movement print data to the print execution unit 290 (FIG. 1). In S290, the control unit 298 of the print execution unit 290 drives the conveying unit 296 in accordance with the received movement print data (movement data in this case). In this manner, the sheet PM moves in the sub-scanning direction D3 by the same distance as the width Wu without performing main scanning that drives the print head 292. The processing then proceeds to S295.

When the target image IM illustrated in FIG. 2 is printed, the sheet PM is first conveyed so that the relative position in the sub-scanning direction D3 of the print head 292 with respect to the sheet PM is at an initial position P1. Although not shown in FIG. 3, the sheet PM may be conveyed to the initial position P1 in any stage prior to S208. In this state, the print head 292 can form dots on twenty-one unit areas UA which are continuous in the downstream side of the downstream direction D4 from the first unit area UA(001). The first unit area UA(001) is then selected as the target unit area (S208 of FIG. 3). Assume that the first unit area UA(001) represents a blank of the target image IM, and the largest index value iMax is equal to or smaller than the threshold value Th (S240: YES of FIG. 4). In this case, the ejection processing is not executed, and the sheet PM moves in the sub-scanning direction D3 by the same distance the width Wu. As a result, the print head 292 is disposed at a second relative position P2 with respect to the sheet PM. At the second relative position P2, the print head 292 can form dots on twenty-one unit areas UA which are continuous in the downstream side of the downstream direction D4 from the second unit area UA(002).

In S295 (FIG. 4), the processor 210 determines whether or not processing for all the unit areas UA has been completed. If there remains an unprocessed unit area UA (S295: NO), the processor 210 returns to S208 of FIG. 3 to execute processing of the unprocessed unit area UA.

In the example illustrated in FIG. 2, the second unit area UA(002) is processed after the processing of the first unit area UA(001) is completed. Assume that the second unit area UA(002) represents the character string object of the target image IM, and the largest index value iMax is larger than the threshold value Th (S240: NO of FIG. 4). In this case, the processing proceeds to S245.

In S245, the processor 210 acquires band data representing a band image from the target image data. The band image is an image in a band area BA constituted with twenty-one continuous unit areas UA including the target unit area. The band area BA is constituted with the target unit area and twenty unit areas UA located on the downstream side of the target unit area in the downstream direction D4. The first band area BA(1) illustrated in FIG. 2 is a band area that includes the second unit area UA(002) as the target unit area, and is constituted with twenty-one unit areas UA from the second unit area UA(002) to the twenty-second unit area UA(022). As described above, one band image is constituted with a plurality of (twenty-one in the present embodiment) unit images which include the target unit image and are continuous in the downstream side of the downstream direction D4 (that is, continuous in the upstream side of the sub-scanning direction D3).

In S250, the processor 210 converts pixel values of each pixel in band data from RGB tone values to CMYK tone values corresponding to color components of coloring materials for printing. The color conversion processing is the same as the processing of S210 (FIG. 3). Since the color conversion of the pixel values in the target unit area has been completed in S210, pixel values of the other unit areas UA are converted in S250.

In S255, the processor 210 performs half-tone processing by using the band data. In the present embodiment, processing in accordance with what is called an error diffusion method is performed as the half-tone processing. Instead, a method using a dither matrix may also be used as the half-tone processing.

In S260, the processor 210 generates band print data which is print data for printing a band image. The band print data includes band image data representing a result of the half-tone processing (a pattern of ink dots), and movement data for conveying the sheet PM after performing the ejection processing based on the band image data. In S260, the print data including the movement data for moving the sheet PM by the same distance as the width (21×Wu) of one band area BA.

In S265, the processor 210 supplies the generated band print data to the print execution unit 290 (FIG. 1). In S270, the control unit 298 of the print execution unit 290 drives the print head 292 and the head moving unit 294 in accordance with the band image data included in the received band print data, and thereby executes the ejection processing. In this manner, the band image is printed. For example, when the second unit area UA(002) of FIG. 2 is the target unit area, a band image of the first band area BA(1) is printed.

In S275, the control unit 298 of the print execution unit 290 drives the conveying unit 296 in accordance with the movement data included in the band print data. In this manner, the sheet PM is moved by the same distance as the width (21×Wu) of the printed band area BA in the sub-scanning direction D3. A third relative position P3 illustrated in FIG. 2 is a relative position of the print head 292 which has been moved. The processing then proceeds to S295. When there remains an unprocessed unit area UA (S295: NO), the processing of S208 to S295 is repeated. Upon generation of the band print data, the processor 210 handles all the unit areas UA constituting the band area BA corresponding to the band print data as processed unit areas. When processing of all the unit areas UA is completed (S295: YES), the printing of the target image IM is completed, and the printing processing is terminated. In the present embodiment, even when the processing of S270 and S275 has not been completed, the processor 210 proceeds to S295 upon the completion of the processing of S265 and advances the processing. However, the processor 210 may also wait for completion of the processing of S270 and S275, and proceed to S295 upon the completion of the processing of S270 and S275.

In the example illustrated in FIG. 2, the second band area BA (from UA(023) to UA(043)) and the third band area BA (from UA(044) to UA(064)) which are continuous in the downstream side of the downstream direction D4 from the first band area BA(1) are printed subsequent to the printing of the first band area BA(1). After the second and third band areas BA(2) and BA(3) are printed, the sheet PM is moved in S275 of FIG. 4 (movement distance=21×Wu). In this manner, the relative position of the print head 292 moves from the third relative position P3 to a fourth relative position P4 and then to a fifth relative position P5.

In the example illustrated in FIG. 2, each of three unit areas UA(065), UA(066), and UA(067) represents a blank. The unit areas UA(065), UA(066), and UA(067) are three unit areas located on the upstream side in the upstream direction D3 among twenty-one unit areas UA in which the print head 292 at the fifth relative position P5 can form dots. When the unit areas UA(065), UA(066), and UA(067) are the target unit areas, the largest index value iMax is equal to or smaller than the threshold value Th (S240: YES of FIG. 4), and the sheet PM is conveyed without performing the scanning by the print head 292 in S280 to S290. In this case, the conveyance of the sheet PM is performed three times by the same distance as the width Wu. In this manner, the print head 292 relatively moves with respect to the sheet PM from the fifth relative position P5 to a sixth relative position P6 by a distance of 3×Wu in the downstream direction D4. The print head 292 at the sixth relative position P6 performs printing of a fourth band area BA(4). The printing of the target image IM is performed in accordance with the procedure described referring to FIGS. 3 and 4.

As described above, in the present embodiment, the determination as to whether or not the unit area UA (that is, a unit image) is a print target, that is, the determination whether or not to print the unit area UA is made by using sixty-four index values corresponding to sixteen partial areas BL (that is, sixteen partial images) included in the unit area UA. Accordingly, accuracy of the determination as to whether or not to print the unit area UA can be improved.

Assume that the determination as to whether or not to print the unit area UA is made without using the plurality of partial areas BL. For example, assume that respective total values of CMYK tone values of all pixels in the unit area UA are used as the total values Csum, Msum, Ysum, and Ksum, and the largest value among four weighted total values Csum×Wc, Msum×Wm, Ysum×Wy, and Ksum×Wk is used as the largest index value iMax in S240 of FIG. 4. In this case, when the unit area UAa represents a blank as illustrated in FIG. 5A, the threshold value Th is determined in advance as a value sufficiently larger than the largest index value iMax which is calculated by using all the pixels Pxd darker than white in the unit area UAa so that the unit area UAa is determined as not to be printed. As illustrated in FIG. 5B, when only one partial area BL represents an object, the number of pixels representing the object is small as compared to the number of pixels representing a blank. Accordingly, the largest index value iMax which is finally calculated can be small as compared to a case where a plurality of partial areas BL represents the object. In particular, when an object is small, the largest index value iMax can be smaller than the threshold value Th. As a result, the unit area UAb representing the object can be determined not to be printed. As described above, when determination is made as to whether or not to print the unit area UA without using a plurality of partial areas BL, the unit area UAb which should be printed may be determined not to be printed in error.

In the present embodiment, the determination as to whether or not to print a unit area UA is made by using a plurality of index values corresponding to a plurality of partial areas BL included in the unit area UA. When the unit area UA does not represent an object but represents only noise, a plurality of pixels representing the noise is distributed among the plurality of partial areas BL like the plurality of pixels Pxd illustrated in FIG. 5A. Accordingly, the number of pixels (for example, the pixels Pxd) representing the noise included in one partial area BL is smaller than the total number of pixels representing the noise included in the unit area UA. On the other hand, when the unit area UA represents an object, pixels representing the object are concentrated in a part of the plurality of partial areas BL (for example, one partial area BL) even if the object represented by the unit area UA is small. In the above manner, there can be made a large difference between the largest index value iMax calculated from one partial area BL when all the plurality of partial areas BL do not represent the object like the unit area UAa illustrated in FIG. 5A, and the largest index value iMax calculated from one partial area BL representing the object when only a part of the partial areas BL represents the object and the other partial areas BL represent a blank like the unit area UAb illustrated in FIG. 5B. As a result, by comparing the largest index value iMax and the threshold value Th, the unit area UA representing only a blank can be appropriately eliminated from a print target, and the unit area UA representing the object can be appropriately selected as a print target.

When the unit area UA (that is, a unit image) is determined not to be printed, the ejection processing for printing the unit area UA is not executed and the sheet PM is conveyed (S280 to S290 in FIG. 4). Accordingly, the time required for the printing can be reduced. In particular, like the unit areas UA(065), UA(066), and UA(067) illustrated in FIG. 2, when a blank exists not in a marginal area but in an inner area of the target image IM, the ejection processing is omitted for the blank in the inner area. Accordingly, the time required for the printing can be appropriately reduced in accordance with the target image IM.

As described in S210 and S225 of FIG. 3, each of pixel values used for calculating an index value is represented by component values (tone values in this case) of a plurality of color components (CMYK in this case). As the index value, an index value for each color component is calculated. Accordingly, as compared with a case where a part of a plurality of color components is not taken into consideration, appropriate determination can be made as to whether or not to print the unit area UA.

In particular, in the embodiment described above, a plurality of color components respectively correspond to a plurality of types of coloring materials that can be ejected from the nozzles Nz of the print head 292 in the print execution unit 290. Accordingly, index values which are appropriate for a printable image can be calculated, as compared to a case where index values are calculated by using component values (for example, RGB tone values) of color components which are independent of the types of coloring materials. As a result, appropriate determination can be made as to whether or not to print the unit area UA.

As described in S225 of FIG. 3, the index values iC, iM, iY, and iK calculated for respective types of coloring material are obtained by respectively multiplying weights Wc, Wm, Wy, and Wk associated with the types of coloring materials by component values of color components (more specifically, total values of tone values). Since index values can be calculated in consideration of characteristics which are different in accordance with the types of coloring materials as described above, determination appropriate for the characteristics of each type of coloring material (more specifically, determination as to whether or not to print the unit area UA) can be made.

In particular, in the present embodiment, the darker the color of the coloring material (for example, color represented by dots of the same size) is, the larger the corresponding one of weights Wc, Wm, Wy, and Wk is. That is, among a plurality of weights corresponding to a plurality of types of coloring materials, as the color of a solid area of equal size printed by coloring material of the same amount is darker (for example, L*, which is a colorimetry value expressed by CIELAB color space of a printed solid area, is smaller), the corresponding weight is larger. In this manner, when the partial area BL (that is, a partial image) includes a pixel of dark and noticeable color, an index value of the partial area BL becomes large. There is high possibility that a pixel of a noticeable color represents an object which should be printed (for example, a character or a photograph), not noise. Accordingly, when the partial area BL represents an object, the possibility of incorrect determination not to print the unit area UA including such partial area BL can be decreased. It is highly likely that a pixel which is bright and not noticeable may represent noise as compared to a pixel which is dark and noticeable. Accordingly, when the plurality of partial areas BL in the unit area UA does not represent an object but represents only noise, the possibility of incorrect determination to print the unit area UA can be decreased.

The index values iC, iM, iY, and iK are positively correlated with respective total values of component values (tone values in this case) of color components corresponding to the index values in the partial area BL. As described in S235 and S240 of FIG. 4, four index values iC, iM, iY, and iK are calculated for each of sixteen partial areas BL included in one target unit area, and produce sixty-four index values. When the largest index value among the sixty-four index values exceeds the threshold value Th, the target unit area is determined to be printed. Accordingly, in the present embodiment where the index values are large due to pixel values of pixels to be printed, appropriate determination can be made as to whether or not to print the unit area UA.

In the present embodiment, the print execution unit 290 is operable in a mode in which the print resolution is the first resolution and a mode in which the print resolution is the second resolution which has a higher density than the first resolution. As described in S200 and S201 of FIG. 3, when printing is executed in a print mode including that the print resolution is the first resolution which is a comparatively low print resolution (the "Fast" print mode in this case), the processor 210 determines whether or not to print each of the unit areas UA, and controls the print execution unit 290 in accordance with the result of the determination. Accordingly, in the print mode for which fast printing is desired, the ejection processing is omitted for the unit area UA that is determined not to be printed, and the time required for the printing can be reduced. When printing is executed in a print mode including that the print resolution is the second resolution which is a comparatively high print resolution (the "Fine" print mode in this case), the processor 210 controls the print execution unit 290 to execute the ejection processing over the entire target image (S202). Accordingly, in the print mode for which a high-quality image is desired, problems such as that an unprinted portion is generated can be suppressed.

In the present embodiment, the print execution unit 290 is operable in a mode in which the number of passes is one, and a mode in which the number of passes is more than one (two in this case). As described in S200 and S201 of FIG. 3, when printing is executed in a print mode including that the number of passes is one (the "Fast" print mode in this case), the processor 210 determines whether or not to print each of the unit areas UA, and control the print execution unit 289 in accordance with the result of the determination. Accordingly, in the print mode for which the fast printing is desired, the ejection processing is omitted for the unit area UA which is determined not to be printed, and the time required for the printing can be reduced. When printing is executed in the print mode including that the number of passes is more than one (the "Fine" print mode in this case), the processor 210 controls the print execution unit 290 to execute the ejection processing over the entire target image (S202). Accordingly, in the print mode for which a high-quality image is desired, problems such as that an unprinted portion is generated can be suppressed.

As described in FIG. 2, the print head 292 can print, in single ejection processing, a band image in the band area BA constituted with H number of unit areas UA (where H is an integer equal to or greater than two, and H=21 in this case) which are continuous in the sub-scanning direction D3. As described in S260 and S275 of FIG. 4, a movement distance in the movement processing which is performed when the target unit area (that is, the target unit image) is determined to be printed is the same as a total width of the H-number of unit areas UA constituting the band area BA, that is, a total width of the H-number of unit images constituting the band image (21×Wu in this case). As described in S295 of FIG. 4, the processor 210 handles the H-number of unit areas UA constituting the band area BA to be printed as processed unit areas when the target unit area is determined to be printed. As a result, the determination as to whether or not to print a unit image is omitted for the H-1 numbers of unit areas UA which are continuous in the downstream side of the downstream direction D4 from the target unit area. Accordingly, the time required for the printing can be reduced as compared with a case where the determination is made for all the unit areas UA.

As described in FIGS. 3 and 4, the processing of the calculation of index values (S225), the processing of the determination as to whether or not to print a unit image (S240), and the processing of supplying band print data or movement print data to the print execution unit 290 depending on the result of the determination (S265, S285) are sequentially executed for each of the unprocessed unit areas UA (that is, each unprocessed unit image) one by one in the downstream direction D4. Accordingly, the time required for printing can be reduced as compared to a configuration in which the determination as to whether or not the unit areas are to be printed is made after the calculation of index values for all the unit areas UA is completed, and print data is supplied to the print execution unit 290 after the determination is performed for all the unit areas UA.

In particular, in the present embodiment, in S210 of FIG. 3, color space of unit data is converted from first color space (RGB color space in this case) to second color space (CMYK color space in this case) specified by corresponding color components of types of coloring materials. As described in S260, the band print data includes the band image data, and the band image data represents a result of the half-tone processing, that is, formation states of dots in a plurality of areas corresponding to a plurality of pixels included in the band image. The color conversion (S210), the calculation of index values using pixel values represented in the second color space (S225), the determination using the index values (S240), and the supply of the band print data or the movement print data depending on the result of the determination (S265, S285) are sequentially executed for each of the unprocessed unit areas UA (that is, each unprocessed unit image) one by one in the downstream direction D4. Accordingly, the time required for printing can be reduced as compared to a configuration in which the index values are calculated after the color conversion of all pixels is completed, the determination as to whether or not to print each of the unit areas UA is made after the calculation of the index values is completed for all the unit areas UA, and the print data is supplied to the print execution unit 290 after the determination is made for all the unit areas UA.

B. Variations (1) As the printing processing, a variety of types of processing can be employed in place of the processing described in FIGS. 3 and 4. For example, the processor 210 may determine whether or not the largest index value among four index values of the partial area BL is equal to or smaller than the threshold value Th between S225 and S230 in FIG. 3. When the largest index value exceeds the threshold value Th, the processor 210 may determine to print the target unit area, and proceeds to S245 in FIG. 4 by omitting the calculation of index values of the remaining partial areas. In this manner, when the unit area UA is constituted with N number (N=16 in the above embodiment) of partial areas BL, only a part of the N number of partial areas BL may be used for the determination. In general, the determination as to whether or not to print the unit area UA may be made in accordance with index values of J number (where J is an integer equal to or greater than one and equal to or smaller than N) of partial areas BL (for example, at least J number of index values).

The processing in S200 of FIG. 3 may also be omitted. That is, the processor 210 may execute the processing subsequent to S204, that is, processing of controlling the print execution unit 290 in accordance with a result of the determination as to whether or not to print each of the unit areas UA, regardless of the print resolution. The print resolution of the printing performed by the print execution unit 290 may be fixed to one resolution.

The processing in S201 of FIG. 3 may also be omitted. That is, the processor 210 may execute the processing subsequent to S204, that is, the processing of controlling the print execution unit 290 in accordance with a result of the determination as to whether or not to print each of the unit areas UA, regardless of the number of passes. The number of passes in the printing performed by the print execution unit 290 may be fixed to one number of passes (for example, one).

The print execution unit 290 may allow a user to select the print resolution and the number of passes independently of each other.

(2) As the index values, a variety of values may be employed in place of the index values described in S225 of FIG. 3. In general, a variety of index values are employable which allow the unit area UA to be more easily determined as a printing target, as an amount of coloring materials in the partial area BL, which is determined in accordance with a plurality of pixels in partial data representing the partial area BL, is larger.

For example, index values may be calculated by using tone values of a part of a plurality of types of color components from one partial area BL. For example, a total value of tone values of one color component (for example, the total value Ksum of tone values of black K) may be used as the index value. One index value obtained by combining tone values of at least a part of a plurality of color components may be calculated from one partial area BL. For example, a total value of weighted tone values of CMYK (Wc×Csum+Wm×Msum+Wy×Ysum+Wk×Ksum) may be used as the index value.

The total number of color components of pixel values in the target image data may be any number equal to or greater than one in place of four. For example, the total number of color components may be one (for example, black K). In this case as well, the index value may be calculated by using a tone value of the one color component. Color components of pixel values used for calculation of the index value may be color components different from types of coloring materials (for example, RGB).

The weights of color components may be equal to one another (for example, Wc=Wm=Wy=Wk). In this case, the weights Wc, Wm, Wy, and Wk may be omitted from the calculation of the index value.

The index values may be a variety of values which are in positive correlation with the total values Csum, Msum, Ysum, and Ksum, in place of the values obtained by respectively multiplying the total values by the weights Wc, Wm, Wy, and Wk. For example, the index value may be an average tone value in the partial area BL, or a median of tone values in the partial area BL. A value obtained by multiplying each of such values by a weight of each color component may be the index value.

As the index values, a variety of other values can also be employed. For example, the total number of colored pixels (that is, pixels representing colors different from white which is brightest) in the partial area BL may be employed. Further, a largest tone value in the partial area BL may be employed, or the total number of dots in the partial area BL specified by the half-tone processing may be employed.

Only a part of pixels in the partial area BL may be used for the calculation of the index values. For example, only even-numbered pixels among a plurality of pixels arranged along the main scanning direction D1 may be used.

(3) As the conditions for determination as to whether or not to print a unit area, there can be employed a variety of conditions indicating that an amount of coloring material in the partial area BL represented by the index values is large. For example, there may be employed a condition indicating that at least one index value of at least one partial area BL exceeds the threshold value. In general, when the unit area UA is constituted with N number of partial areas BL, determination as to whether or not to print the unit area UA may be made according to index values of J number of partial areas BL (where J is an integer equal to or greater than one and equal to or smaller than N). For example, when one unit area UA is constituted with N number of partial areas BL, and each of pixel values is represented by L number of color components, the condition may indicate that the largest index value among J×L number of index values constituted with L number of index values of J number of partial areas BL (where J is an integer equal to or greater than one and equal to or smaller than N) among N number of partial areas BL exceeds the threshold value.

(4) In the embodiment illustrated in FIG. 2, the band area BA corresponding to a band image printed by single ejection processing is constituted with twenty-one unit areas UA. The total number of the unit areas UA constituting one band area BA may be any number equal to or larger than one. For example, one unit area UA may constitute one band area BA.

(5) In the embodiment illustrated in FIGS. 3 and 4, the processing for printing (for example, the calculation of the index values, the determination as to whether or not to print the unit area UA, and the supply of the band print data or the movement print data to the print execution unit 290) is performed sequentially for each of the unprocessed unit areas UA one by one in the downstream direction D4. Instead, the processing for printing may be performed sequentially for a plurality of (for example, two) unit areas UA at a time.

(6) The target image data used for printing may be any other image data in place of scan data. For example, the target image data may be image data designated by a user. When a format of the designated image data is different from the bitmap format (for example, enhanced metafile (EMF) format), the processor 210 may use bitmap data generated by converting (for example, rasterizing) the data format as the target image data.

(7) In the embodiment illustrated in FIG. 2, a margin is provided between an edge of the target image IM and an edge of the sheet PM. However, the target image IM may be printed on the entire sheet PM (which is also called borderless print). In this case, the processor 210 may form print data so that the edge of the sheet PM and the edge of the target image IM are overlapped with each other. The processor 210 may also form print data so that the edge of the target IM protrudes outside the edge of the sheet PM. In any case, the processor 210 only needs to divide the target image IM into a plurality of unit areas UA, and determine whether or not to print each of the unit areas UA.

(8) As a configuration of the control device that controls the print execution unit 290, a variety of configurations may be employed in place of the configuration of the control device 202 illustrated in FIG. 1. For example, at least one of the display unit 240, the operation unit 250, and the communication interface 270 may be omitted. The control device 202 and the print execution unit 290 may be separate devices which are independent of each other. For example, the control device 202 may be a device separate from the print execution unit 290, such as a personal computer and a smartphone. A plurality of devices (for example, computers), which can communicate with each other through a network, may share functions of the processing performed by the control device 202, so that the devices as a whole provide the functions of the processing performed by the control device 202 (a system including these devices corresponds to the control device). The print execution unit may be a single-function printer.

(9) As a configuration of the print execution unit, a variety of other configurations can be employed in place of the configuration of the print execution unit 290 in the embodiment. For example, coloring materials which can be used for printing may be any coloring materials in place of CMYK (for example, only black K, only CMY, or a combination of CMY and light cyan which is lighter than cyan C). The printing method may be other methods (for example, a laser method) in place of the inkjet method.

In the embodiments described above, a part of the configuration built with hardware may be replaced with software. In contrast, a part or whole of the configuration built with software may be replaced with hardware. For example, the function of executing the processing of S225 in FIG. 3 may be performed by a dedicated hardware circuit.

When a part or whole of the functions of the present disclosure is implemented by a computer program, the program can be provided in the form of being stored in a computer-readable storage medium (for example, a non-transitory storage medium). The program may be used in the state of being stored in a storage medium (a computer-readable storage medium) which is the same as or different from one used at the time of provision. The "computer-readable storage medium" is not limited to a portable storage medium, such as a memory card or a CD-ROM, and may include an internal storage device in a computer, such as a variety of ROMs, and an external storage device connected to a computer, such as a hard disk drive.

While the description has been made in detail with reference to specific embodiments, the embodiments described above are not for limiting the present disclosure but for easy understanding of the present disclosure. It would be apparent to those skilled in the art that various changes and modifications may be made thereto without departing from the spirit and scope of the above described aspects.

What is claimed is:

1. A control device for controlling a printer, wherein the printer includes:
   a print head configured to move in a main scanning direction and having a plurality of nozzles arranged in a sub-scanning direction perpendicular to the main scanning direction, each of the plurality of nozzles being configured to eject a droplet of coloring material onto a printing medium,
   the control device comprising:
   a controller configured to perform:
      acquiring target image data representing a target image, the target image including a plurality of unit images, each of the plurality of unit images extending in the main scanning direction;
      specifying a target unit image among the plurality of unit images, the target unit image including N number of partial images arranged in the main scanning direction, where N is an integer equal to or greater than two;
      specifying J number of target partial images among the N number of partial images, where J is an integer equal to or greater than one and equal to or smaller than N;
      calculating J number of index values corresponding to respective ones of the J number of target partial images, each of the J number of index values being calculated using a plurality of pixel values of a plurality of pixels included in corresponding one of J number of target partial data, the J number of target partial data representing respective ones of the J number of target partial images;
      determining whether to print the target unit image according to the J number of index values;
      in response to determining to print the target unit image, controlling the printer to execute ejection processing and movement processing for printing a band image onto the printing medium, the band image constituted with H number of successive unit images arranged in the sub-scanning direction and including the target unit image, the ejection processing ejecting the droplet of the coloring material onto the printing medium while moving the print head in the main scanning direction, the movement processing moving the printing medium in the sub-scanning direction with respect to the print head, where H is an integer equal to or greater than one; and
      in response to determining not to print the target unit image, controlling the printer to execute the movement processing but not execute the ejection processing for printing the target unit image onto the printing medium.

2. The control device according to claim 1, wherein the printer is selectively operable in a first mode and a second mode, the controller being configured to control the printer to execute the ejection processing with a single-pass process in the first mode, the single-pass process moving the print head in the main scanning direction once, the controller being configured to control the printer to execute the ejection processing with a multi-pass process in the second mode, the multi-pass process moving the print head in the main scanning direction a plurality of times;
   wherein in the first mode, the controller is configured to perform controlling the printer according to a result of the determining; and
   wherein in the second mode, the controller is configured to perform controlling the printer to execute the ejection processing over the target image.

3. The control device according to claim 1, wherein the plurality of nozzles includes L number of nozzle groups corresponding to respective ones of L number of coloring materials, the L number of coloring materials being different in color from one another, where L is an integer equal to or greater than two;
   wherein each of the plurality of pixel values has L number of color component values corresponding to the L number of coloring materials; and
   wherein each of the J number of index values has L number of color index values corresponding to the L number of coloring materials, each of the L number of color index values being calculated using corresponding one of the L number of color component values.

4. The control device according to claim 3, wherein each of the L number of color index values is calculated using respective ones of L number of weights defined corresponding to the L number of coloring materials.

5. The control device according to claim 4, wherein each of the L number of weights is defined depending on darkness of corresponding one of the L number of coloring materials.

6. The control device according to claim 3, wherein each of the L number of color index values is calculated in correlation with corresponding one of L number of total values corresponding to the L number of coloring materials, each of the L number of total values being calculated by summing corresponding ones of the L number of color component values with respect to a plurality of pixels included in corresponding one of the J number of target partial images; and
  wherein the determining determines to print the target unit image when a largest index value among J×L number of color index values is greater than a threshold value, the J×L number of color index values being constituted with respective L number of color index values for each of the J number of target partial images.

7. The control device according to claim 1, wherein the printer is selectively operable in a first mode and a second mode, the controller being configured to control the printer to execute the ejection processing with a first print resolution in the first mode and a second print resolution in the second mode, the second print resolution having a higher density than the first print resolution;
  wherein in the first mode, the controller is configured to perform controlling the printer according to a result of the determining; and
  wherein in the second mode, the controller is configured to perform controlling the printer to execute the ejection processing over the target image.

8. The control device according to claim 1, wherein H is an integer equal to or greater than two;
  wherein a movement distance in the movement processing is the same as a total width of the H number of successive unit images in the sub-scanning direction, the H number of successive unit images being constituted with the target unit image and (H−1) number of successive unit images arranged on a downstream side of the target unit image in the sub-scanning direction; and
  wherein the determining omits determination on the (H−1) number of successive unit images.

9. The control device according to claim 1, wherein the controller is further configured to perform:
  generating band print data for printing the band image onto the printing medium and supplying the band print data to the printer in response to determining to print the target unit image; and
  wherein the calculating, the determining and the generating are sequentially performed for unprocessed ones of the plurality of unit images one by one in a direction opposite to the sub-scanning direction.

10. The control device according to claim 9, wherein the controller is further configured to perform:
  converting color space of the target image data from first color space to second color space specified by a color component corresponding to a type of the coloring material;
  wherein the band print data indicating a plurality of dot formation states of a plurality of areas, each of the plurality of areas corresponding to a plurality of pixels included in the band image; and
  wherein the converting, the calculating, the determining and the generating are sequentially performed for unprocessed ones of the plurality of unit images one by one in the direction opposite to the sub-scanning direction.

11. A non-transitory computer readable storage medium storing a set of program instructions for a control device for controlling a printer, the printer comprising:
  a print head configured to move in a main scanning direction and having a plurality of nozzles arranged in a sub-scanning direction perpendicular to the main scanning direction, each of the plurality of nozzles being configured to eject a droplet of coloring material onto a printing medium, the control device comprising a controller, the set of program instructions, when executed by the controller, causing the control device to perform:
    acquiring target image data representing a target image, the target image including a plurality of unit images, each of the plurality of unit images extending in the main scanning direction;
    specifying a target unit image among the plurality of unit images, the target unit image including N number of partial images arranged in the main scanning direction, where N is an integer equal to or greater than two;
    specifying J number of target partial images among the N number of partial images, where J is an integer equal to or greater than one and equal to or smaller than N;
    calculating J number of index values corresponding to respective ones of the J number of target partial images, each of the J number of index values being calculated using a plurality of pixel values of a plurality of pixels included in corresponding one of J number of target partial data, the J number of target partial data representing respective ones of the J number of target partial images;
    determining whether to print the target unit image according to the J number of index values;
    in response to determining to print the target unit image, controlling the printer to execute ejection processing and movement processing for printing a band image onto the printing medium, the band image constituted with H number of successive unit images arranged in the sub-scanning direction and including the target unit image, the ejection processing ejecting the droplet of the coloring material onto the printing medium while moving the print head in the main scanning direction, the movement processing moving the printing medium in the sub-scanning direction with respect to the print head, where H is an integer equal to or greater than one; and
    in response to determining not to print the target unit image, controlling the printer to execute the movement processing but not execute the ejection processing for printing the target unit image onto the printing medium.

* * * * *